(No Model.)
J. G. BROWN.
BICYCLE CRANK.
No. 605,472.
Patented June 14, 1898.
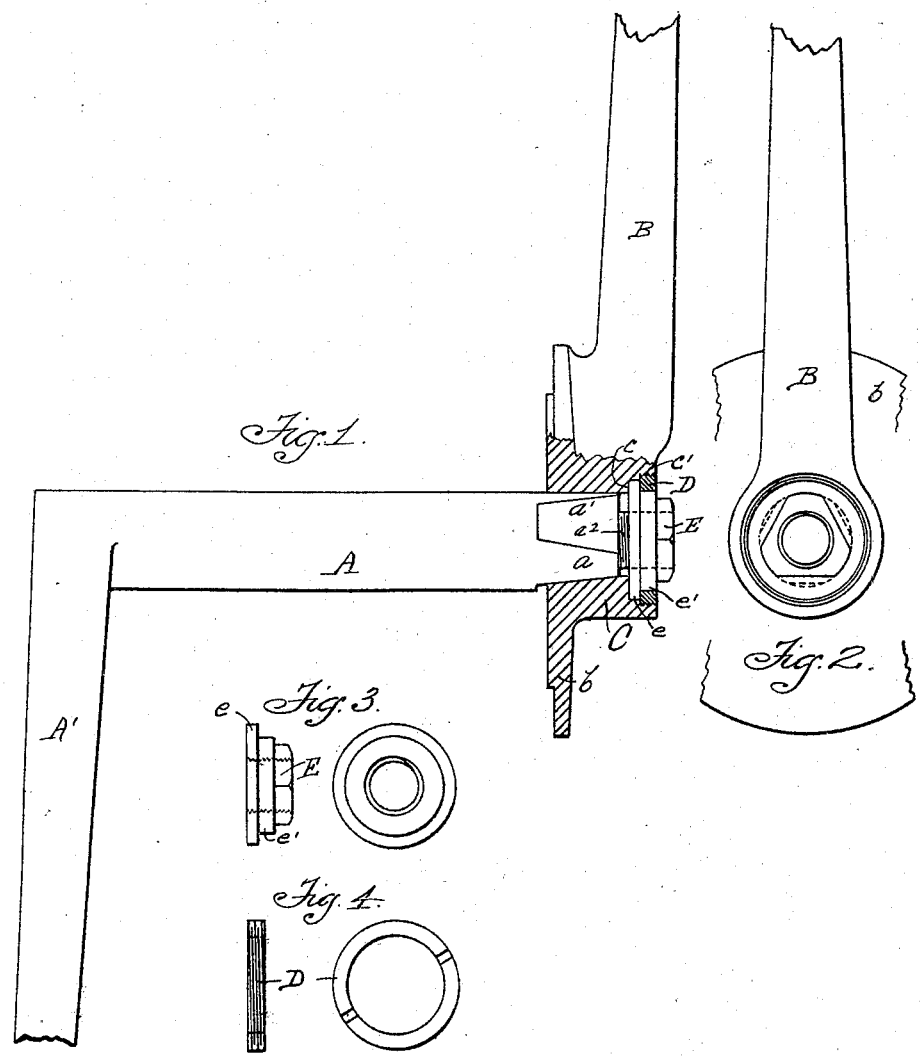
Witnesses.
C. A. Corzett
David Levan
James G. Brown Inventor.
by
Attorney.

United States Patent Office.

JAMES G. BROWN, OF READING, PENNSYLVANIA, ASSIGNOR TO THE READING CYCLE MANUFACTURING COMPANY, OF SAME PLACE.

BICYCLE-CRANK.

SPECIFICATION forming part of Letters Patent No. 605,472, dated June 14, 1898.

Application filed October 7, 1897. Serial No. 654,365. (No model.)

*To all whom it may concern:*

Be it known that I, JAMES G. BROWN, a citizen of the United States, residing at Reading, county of Berks, State of Pennsylvania, have invented certain Improvements in Bicycle-Cranks, of which the following is a specification.

My invention relates particularly to bicycle-cranks, and more especially to that class in which the separately-formed crank is secured to the end of the shaft by a tightly-drawn tapering engagement.

The main object of my improved construction, as described hereinafter in connection with the accompanying drawings, is to provide for the easy and satisfactory loosening of this engagement when for any reason it becomes desirable.

Figure 1 is an elevation, partly in section, of a crank-shaft embodying my improvements. Fig. 2 is an outer face view of the crank, showing the end of the shaft in position therein, but the nut and screw-collar removed. Figs. 3 and 4 are separate views of the nut and screw-collar, respectively.

A represents the shaft, which, as shown, is formed in one piece with the crank A'. The opposite crank B is formed separately and, as shown, has a sprocket-wheel flange $b$ on the inner face of its hub C. The end portion $a$ of the shaft-body is tapered outward and preferably made angular in cross-section by forming one or more flat surfaces thereon, as indicated at $a'$. The opening in the hub C of the crank is similarly shaped and tapered to receive the shaft and is counterbored in its outer portion, so as to form a circular seat $c$, and screw-threaded at $c'$ to receive a removable collar D, hereinafter referred to.

The tapered end $a$ of the shaft is drawn tightly into engagement with the crank B by means of the nut E, which screws upon the threaded projection $a^2$ of the shaft. This nut is formed with a circular flange $e$, which bears against the seat $c$ in the hub of the crank, and it is also provided with a short cylindrical portion $e'$ of smaller diameter than the collar $e$, but at least equal in diameter to the distance across the corners of the angular head of the nut. Upon this cylindrical portion of the nut is loosely fitted the screw-collar D, already referred to. The periphery of this collar is preferably screw-threaded reversely to that of the thread in the nut and is screwed into the threaded portion $c'$ of the hub-opening, close to the outer face of the nut-flange.

When the nut E is tightly drawn up, the tapered end of the shaft will be so tightly seated in the hub as to effectually prevent any loosening of the crank B upon the shaft even by long-continued hard service; but when it becomes necessary to remove the crank B for any purpose more or less difficulty is apt to be experienced. This is entirely avoided with my improved construction, as it is merely necessary to turn the nut E in the proper direction for removing it from the shaft, but without removing the collar D, the effect of which will be to prevent outward movement of the nut, and thus to force the shaft out of the hub C as readily as it was drawn in. The thread in the nut and on the collar being respectively right and left handed, the collar is not apt to be loosened by the turning of the nut.

What I claim is—

The combination with a bicycle crank-shaft having a tapered body portion of angular cross-section and a projecting screw-threaded portion, of an engaging crank having a hub adapted to engage said tapered body, a counterbore in said hub forming a shoulder $c$, and screw-threaded at $c'$; a nut having a flange seating against said shoulder, and a cylindrical body portion adjacent to the flange, and a collar loose upon said cylindrical body of the nut and having its periphery screw-threaded to engage the threaded counterbore of the hub; substantially as set forth.

In testimony whereof I affix my signature in presence of two witnesses.

JAMES G. BROWN.

Witnesses:
 CAMERON E. STRAUSS,
 W. G. STEWART.